May 30, 1950 R. B. DOME 2,509,730

SYNCHRONIZING SYSTEM

Filed May 1, 1946 2 Sheets-Sheet 1

Inventor:
Robert B. Dome,
by Merton D. Moore
His Attorney.

May 30, 1950 R. B. DOME 2,509,730

SYNCHRONIZING SYSTEM

Filed May 1, 1946 2 Sheets-Sheet 2

Inventor:
Robert B. Dome,
by Merton D. Morse
His Attorney.

Patented May 30, 1950

2,509,730

UNITED STATES PATENT OFFICE 2,509,730

SYNCHRONIZING SYSTEM

Robert B. Dome, Bridgeport, Conn., assignor to General Electric Company, a corporation of New York Application May 1, 1946, Serial No. 666,277

4 Claims. (Cl. 178—69.5)

Figure 1:
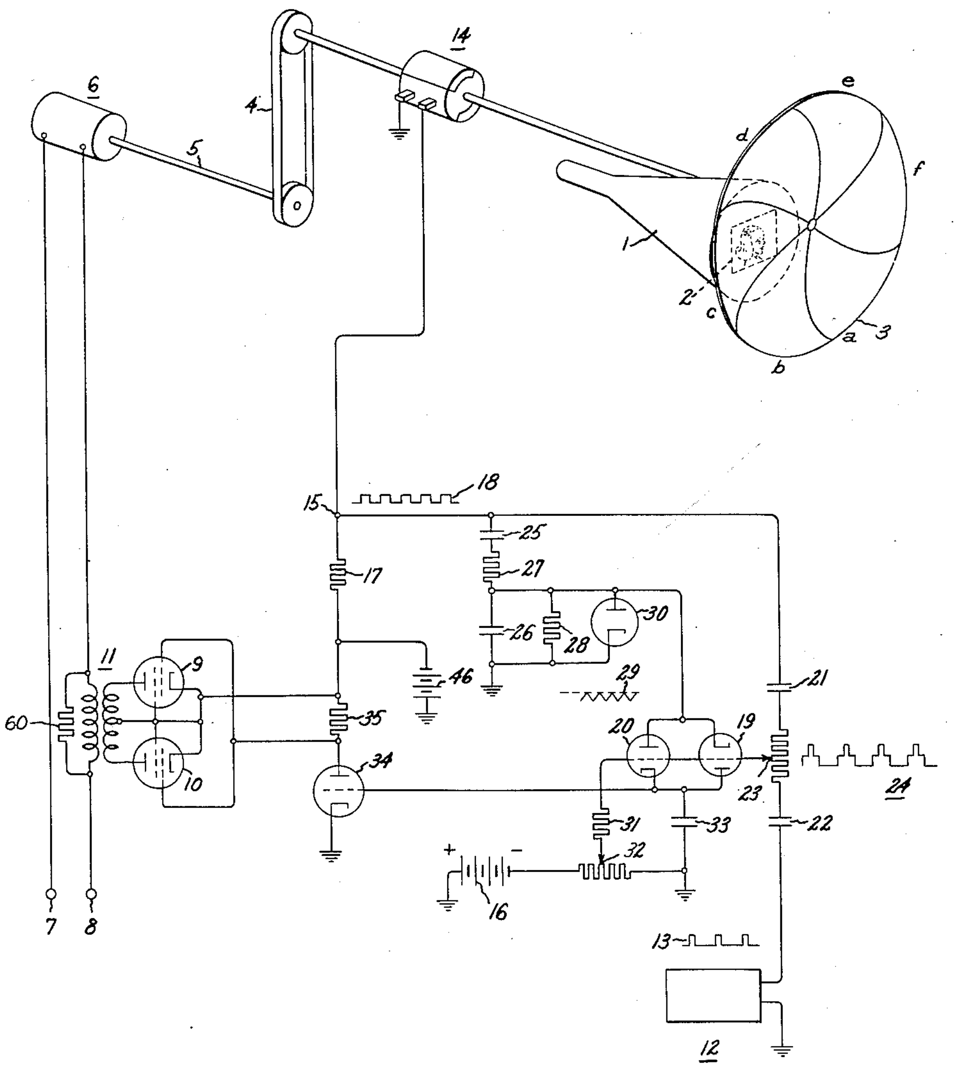

This invention relates to television and more particularly to reconstituting a visual program in its true color.

In one method of color television, the visual program is successively scanned through a group of color filters each of which represents one primary color, thus producing a visual signal corresponding successively to the various color components of the visual program. These signals are caused to modulate a radio frequency carrier wave which is picked up in the television receiver and detected to produce a signal voltage corresponding to the visual program. The latter signal is then caused to produce an image in varying intensities of white light on a viewing screen and color filters successively introduced between the observer and the image to reproduce the successive images in their true color. Inasmuch as this scanning takes place at a rapid rate compared to the persistence of human vision, the successive color images are merged in the eye of the observer into a single multi-color reproduction of the visual program.

Faithful reproduction of the visual program demands that the successive color images produced on the viewing screen correspond in color to the color filter interposed at the television transmitter. It is therefore necessary that the successive color filters introduced between the observer and the image at the television receiver be synchronized with transmitter operation. In one system of reproduction this is accomplished by providing a rotatable disk having segments of color filter material arranged in sequential order corresponding to the color sequence scanned by the television transmitter. This disk is then rotated in synchronism with the scanning by the television transmitter to achieve the desired reproduction.

It is an object of my invention to provide improved means to synchronize the rotating color filter in a television receiver with scanning of the visual program at the transmitter.

Another object of my invention is to synchronize the rotating color filter of a television receiving system in a manner that is simple and reliable in operation, requires a minimum number of circuit components, and has a high degree of stability and freedom from hunting.

A further object of my invention is to provide means to synchronize the rotation of a body with respect to predetermined control signals which means are entirely electrical in operation and permit taking advantage of the high degree of reliability and low cost inherent in the use of alternating current induction motors.

Further it is an object of my invention to provide improved means to synchronize the rotation of a body with respect to periodic control signals which means tends to maintain the system in a near-synchronous condition if the synchronizing signals disappear.

Yet another object of my invention is to provide improved means to synchronize the rotation of a body with respect to control signals in a manner that protects the driving and control system from overheating or other damage in the event control signals are lost.

The novel features which I believe to be characteristic of my invention are set forth with particularity in the appended claims. My invention itself, both as to its organization and method of operation, together with further objects and advantages thereof may best be understood by reference to the following description taken in connection with the accompanying drawing in which Fig. 1 shows a complete synchronizing system constructed in accordance with the principles thereof and Fig. 2 shows a modification of the circuit of Fig. 1.

Figure 2:
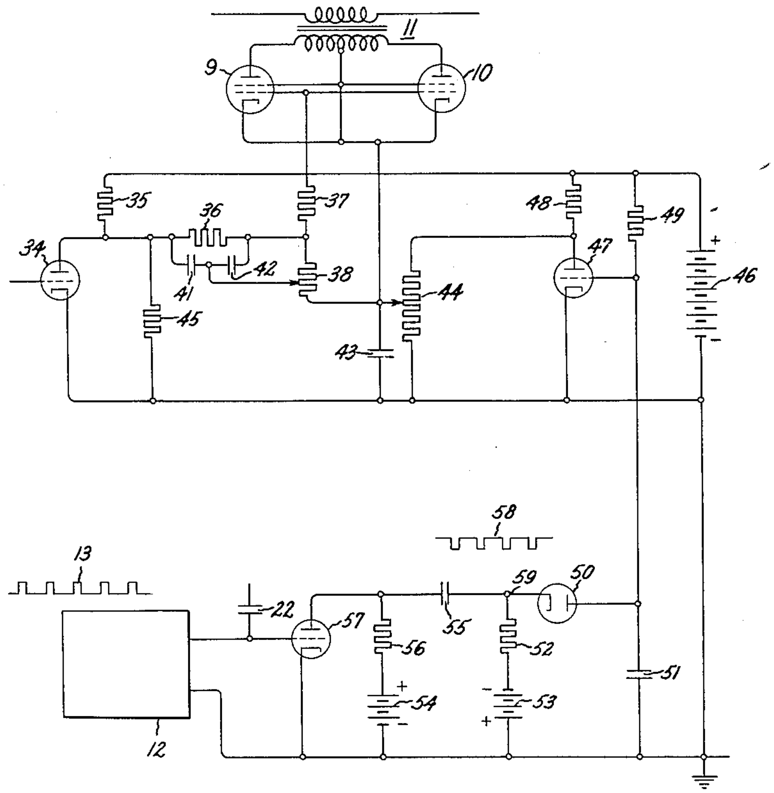

In Fig. 1, a cathode ray tube connected to a television receiving system is shown at 1 and the resultant image shown generally at 2. This image corresponds successively with the three colors scanned by the associated television transmitter but, being on a single cathode ray tube viewing screen consists only of varying intensities of white light. Color disk 3 is provided successively to interpose between image 2 and the eye of the observer color filters corresponding to the colors successively scanned by the television transmitter, this filter having segments of color filter material arranged for this purpose. Rotation of filter 3 is provided by the mechanical system including drive belt 4 which is connected to shaft 5, and motor 6 which rotates shaft 5, thus successively interposing filter segments *a*, *b*, *c*, etc., between the observer and the image to reproduce the successive images in their true color content.

Motor 6 is of the single phase induction type and receives energizing currents from an alternating voltage source connected to terminals 7 and 8. Preferably, the source at terminals 7 and 8 has a highly stable frequency, and is of such capacity as not to be influenced in frequency by changes in the power requirements of motor 6. Such a source might, for example, be the alternating voltage supply to a household, since the frequency of such voltage, as maintained by the public utility system, is generally very stable and characterized by a high degree of accuracy. The pulleys on which belt 4 operates are then chosen of such diameter that the rotational velocity of motor 6 with minimum voltage drop in the primary winding of transformer 11 is slightly in excess of the rotational velocity of disk 3 for perfect synchronization of the system. That is, with minimum voltage drop at the primary winding of transformer 11 and the normal mechanical loading of motor 6 due to windage and friction in the moving parts connected thereto, the rotational velocity of disk 3 should be slightly in excess of the desired value. If, for example, disk 3 operates at 600 revolutions per minute under normally synchronized conditions, and motor 6 operates at 1750 revolutions per minute with the normal mechanical load and minimum voltage drop on transformer 11, the pulleys for belt 4 might be arranged to rotate disk 3 at, say 620, revolutions per minute when motor 6 is operating at 1750 revolutions per minute.

Transformer 11 is connected in parallel with resistance 60 to provide an adjustable voltage drop between motor 6 and the applied voltage at terminals 7 and 8. Inasmuch as variations in this voltage alter the torque of motor 6 at any one operating speed (or slip), this permits variations of the speed of motor 6 in accordance with the voltage drop across transformer 11. When this voltage drop is large, for instance, the torque of motor 6 is smaller than normal at any particular value of slip and the rotational velocity of motor 6 must decrease until the slip increases to a value causing the motor torque to equal the frictional and windage torque. Hence, the motor operating speed is reduced in accordance with the voltage drop across transformer 11. Similarly, if the voltage drop of transformer 11 decreases, the torque of motor 6 at any one value of slip is increased and the motor operates at the lower value of slip (higher speed) causing the motor torque to equal the frictional and windage torque.

The voltage drop across the primary winding of transformer 11, and hence the rotational velocity of motor 6, is determined by means of electron discharge devices 9 and 10 located in the secondary circuit thereof. When these devices are in a non-conducting condition, the impedance in the secondary winding of transformer 11 is very great, thereby reflecting a large impedance in the primary circuit and causing a relatively large voltage drop across the primary winding. When these devices are conducting, the effective secondary impedance at transformer 11 is relatively small and the voltage drop across the primary winding accordingly reduced. This operation results from the well known theory that the effective primary voltage drop of a transformer with a closed primary circuit is given by the relation:

$$e=\left[\frac{a^2Z_LZ_s}{Z_L+a^2Z_s}\right]i$$

Where $Z_s$ is the secondary load impedance, $Z_L$ the leakage impedance, $a$ the ratio of primary turns to secondary turns, and $i$ the primary current flow.

In the circuit of Fig. 1, discharge devices 9 and 10 are of the gas discharge type rather than the high vacuum type. These tubes, when once rendered conducting, remain in the conducting condition until the anode-cathode voltage is removed or reaches a very low value. In this case, each device is in the non-conducting condition for the first portion of the cathode-anode space path voltage cycle and is in the conducting condition for the remainder of the cycle, the instant of transfer from one condition to the other being determined by the value of cathode-control electrode space path voltage. The actual effective impedance of the devices in establishing the operating voltage at motor 6 is then determined by the relative portion of each voltage cycle during which the devices 9 and 10 are conducting. As the control electrode-cathode bias voltage is increased in the positive direction, this conducting portion increases as compared with the total duration of the voltage cycle, thus increasing the speed of motor 6. On the other hand, if the control electrode-cathode bias voltage is made less positive, the reverse effective takes place and the speed of motor 6 is reduced accordingly.

It is the function of the circuits including commutator 14 and electron discharge devices 30, 19, 20, and 34 to control the cathode-control electrode space path voltages at devices 9 and 10 to maintain the rotational velocity and phase position of motor 6 at the value corresponding with scanning of the visual program by the television transmitter. These circuits, per se, form no part of my invention and are described and claimed in the copending application of R. F. Wood, Ser. No. 666,275, filed May 1, 1946, and assigned to the same assignee as this application, now Patent 2,502,195, issued March 28, 1950. The operation of these circuits to produce suitable bias voltage for devices 9 and 10 is described in detail in that application. Briefly, unit 12 is connected to the video amplifier portion of the television receiver to produce a succession of positive voltage pulses such as shown at 13. These pulses, generally designated "color synchronizing pulses," correspond to the successive bursts of radio frequency energy taking place each time a new color cycle is commenced by the television transmitter. As each color cycle consists of producing three successive images, each corresponding to a portion of the color content of the visual program, the pulses indicate the instant the various segments of disk 3 should be interposed before the observer. Commutator 14 is mounted on the shaft of disk 3 and hence has an angular position corresponding to the angular position of that disk. This commutator connects point 15 to ground over two portions of the cycle of rotation of shaft 5 while permitting point 15 to have a positive potential derived from unidirectional voltage source 46 and series resistance 17 during other portions of the cycle. This produces the rectangular voltage wave shown at 18, this voltage wave being in synchronism with the rotation of color disk 3. The voltage waves 13 and 18 are simultaneously applied to the control electrodes of electron discharge devices 19 and 20 through the network comprising capacitors 21 and 22 and potentiometer 23, thus varying the voltage of the control electrodes of these devices in accordance with the wave shown at 24.

The voltage wave 18 is integrated by means of the circuit comprising capacitors 25 and 26 and resistances 27 and 28 to produce a sawtooth voltage wave across capacitor 26 of the shape shown at 29. Electron discharge device 30 causes condenser 25 to charge to a value causing the positive voltage peaks of wave 29 to be at substantially zero potential. This results from conduction through that device until the requisite average charge appears at condenser 25, the capacity of this condenser being sufficient to prevent significant voltage change during a single cycle of wave 18. The voltage of wave 29 is applied across the cathode-anode space paths of back-to-back connected electron discharge devices 19 and 20.

It is the purpose of electron discharge devices 19 and 20 to produce across capacitor 33 a voltage corresponding to the particular instantaneous voltage of wave form 29 occurring in time at the instant the voltage pulses from wave 13 occur, providing the pulses of wave 13 occur at some time while the square wave 18 is in the positive direction. If pulses 13 occur while the square wave 18 is negative, insufficient voltage will be applied to the control electrodes of devices 19 and 20 to cause these devices to become conductive and condenser 33 will retain the potential corresponding to the last instant at which these devices were made conductive. This is accomplished by biasing the control electrodes of these devices from unidirectional voltage source 16 through resistance 31 and potentiometer 32 to a negative voltage sufficient to prevent conduction except when the positive portion of the voltage wave 18 and the voltage pulses of wave 13 coincide. At times of such coincidences, these devices are rendered conducting and the voltage of the ungrounded terminal of condenser 33 is made to assume the particular voltage present at that instant on the anode of electron discharge device 30. The condenser 33 has such capacitance as to permit charging within the time interval occupied by a pulse of wave 13, so that it charges to substantially the value of the instantaneous voltage at the anode of device 30 corresponding to the timing of the pulses 13 with respect to wave 29.

Electron discharge devices 19 and 20 are connected in back-to-back relation to permit discharging as well as charging of condenser 33 so that the voltage thereacross may be increased or decreased in accordance with the particular voltage of wave 29 corresponding in time to the instant these devices are rendered conducting. Since no other charging or discharging path is provided for this condenser, its voltage remains constant between successive pulses in wave 13.

As explained in detail in the above-mentioned copending application of R. F. Wood (now Patent 2,502,195), when the position of commutator 14 (and hence disk 3) lags behind the position corresponding to successive pulses from unit 12, the voltage across capacitor 33 tends to become more negative, thereby reducing the control electrode-cathode voltage of electron discharge device 34, decreasing the current flow through resistance 35 and causing the control electrodes of devices 9 and 10 to become less negative with respect to the cathodes thereof. This decreases the resistance in the secondary winding of transformer 11 and accordingly decreases the voltage drop between terminals 7 and 8 and motor 6, causing this motor to increase in speed and restore the desired rotational position of disk 3. On the other hand if the position of commutator 14 leads the scanning cycle of the television transmitter as indicated by the position of the pulses in the wave 13, the voltage across capacitor 33 tends to become less negative, thereby increasing the negative control electrode bias voltage at devices 9 and 10 and causing motor 6 to decrease in speed.

Of course, the speed changes described above are relatively small in normal operation and in the period between successive pulses in wave 13 only cause motor 6 to change in phase position a small amount. At the next pulse of wave 13, the position of disk 3 is again checked and the voltage across capacitor 33 corrected to vary the voltage at motor 6 in a direction further to bring the position of disk 3 to the desired angular relationship with the pulses. This cycle continues so long as the system is in operation so that any changes tending to cause disk 3 to deviate from the desired angular position as established by the synchronizing pulses is prevented from actually influencing these factors.

Fig. 2 shows a modification of the circuit of Fig. 1 to provide an anti-hunt component in the voltage applied to the cathode-control electrode space paths of devices 9 and 10. In this circuit, a voltage proportional to the space current flow in device 34, and hence the charge on condenser 33 (shown in Fig. 1), is applied to the cathode-control electrode space paths of devices 9 and 10 by the resistance network comprising resistances 35, 45, 36, 37, 48, and potentiometers 38 and 44, the value of this voltage being determined by the voltage divider action of resistance 48 and potentiometer 44, and the divider action of resistance 36 and potentiometer 38 working from a further divider consisting of resistance 35 in series with resistance 45. The latter resistance 45 is shunted by the effective resistance of device 34 and hence under substantially constant conditions of space current flow in device 34, the value of voltage applied to devices 9 and 10 is determined solely by the values of these resistances and the space current flow in that device. However, when the space current flow in device 34 suddenly changes, the voltage drop across resistance 36 cannot instantaneously change by reason of capacitors 41 and 42. In addition, the voltage drop across one portion of potentiometer 38 cannot change because of connection of capacitor 42 thereacross and the voltage drop across one portion of potentiometer 44 cannot change by reason of capacitor 43. This requires that the voltage drop across the remainder of potentiometer 38 be proportionally greater and the control electrode-cathode potential of devices 9 and 10 is accordingly changed over the value that would exist in the presence of only slow changes in space current in device 34. Hence, the effect of the circuit shown in Fig. 2 is to vary the control electrode-cathode space path voltages of devices 9 and 10 in accordance with two voltages, one being determined by the absolute magnitude of the error voltage and the other being determined by the rate of change or derivative of that voltage.

The rate of change or derivative component of error voltage due to the operation of the circuit of Fig. 2 acts in effect to anticipate the correction required of the system. It thus exerts a powerful stabilizing action since time delays inherent in the mechanical and electrical system by reason of the inertia of the rotating parts and the capacitances in the control circuit tend to delay the corrective signal at devices 9 and 10 as compared with the signal required for most effective action. In one embodiment of this invention, for example, color disk 3 hunted over angular errors from 30° to 150° with the circuit of Fig. 1 whereas with the circuit of Fig. 2 hunting was less than 9°, a value sufficiently small for satisfactory operation of the system.

One of the features of the circuit of Fig. 2 resides in the fact that adjustment of potentiometer 38 permits variation of the derivative component of error voltage applied to the cathode-control electrode space paths of devices 9 and 10 without influencing the proportional component of error voltage. It is thus possible to choose the optimum value of derivative component by adjusting this potentiometer and thereby obtain a maximum degree of stability of the system without altering the other circuit adjustments. Inasmuch as the value of this voltage is of substantial importance in obtaining most effective operation of the system, and cannot readily be predicted in advance, this feature is of considerable aid in providing a system having maximum stability.

It is the function of electron discharge devices 47, 50, and 57 and the associated circuits to disable the normal functions of the control circuits when color synchronizing signals are lost. As shown in the figure, voltage from source 12 is applied to the control electrode-cathode space path of device 57, thus to cause the cathode-anode space current of that device to vary in accordance with wave shape 13. This wave is, of course, applied to condenser 22 to operate the control circuits as explained in detail with reference to Fig. 1. Inasmuch as the space current flow in device 57 determines the voltage drop in resistance 56, increase in this current depresses the voltage at the anode thereof below the potential of unidirectional voltage source 54 by an amount in addition to the normal value, thereby producing the wave form 58 which has the reverse polarity of wave 13.

The voltage of waveform 58 is coupled to device 50 through blocking condenser 55. A series circuit from the positive terminal of supply 46 may be traced through resistance 49, device 50, resistance 52, and source 53 to the negative terminal of source 46. As will be described hereafter, operation of the circuit requires that in the absence of the negative pulses of wave 58, sufficient current flow takes place through device 47 to render devices 9 and 10 fully conducting. In the case of one construction of this invention, for example, this condition is satisfied if the control electrode of device 47 is at ground potential when wave 58 contains no negative pulses, a situation that exists if the space path resistance of device 50 is negligible and resistances 49 and 52 satisfy the following relation:

$$\frac{E_{53}}{E_{46}}=\frac{R_{52}}{R_{49}}$$

Where:

$E_{53}$ and $E_{46}$ are the voltages of sources 53 and 46 respectively, and $R_{52}$ and $R_{49}$ are the values of resistances 52 and 49 respectively.

With the above conditions satisfied, device 50 will conduct during the negative portions of the wave 58 and will be non-conductive during the positive portions thereof. This results from the fact that when the wave is first applied, successive pulses cause pulses of current through device 50 and condenser 51, thereby building up voltage thereacross until the anode of device 50 is negative with respect to the cathode except during a brief charging interval during each negative pulse of wave 58. The value of the negative pulses of wave 58, together with the voltage of source 53, is made sufficient to charge condenser 51 to voltage cutting off conduction in the path from the anode to the cathode in device 47. When this condition is attained, the system involving devices 34, 9, and 10 functions as though device 47 were not in the circuit. This operation is described above.

The normal condition of the system of Fig. 2 when television signals are being received is that existing when wave 58 is applied to device 50 and operation is independent of device 47. However, if wave 13 disappears, the negative charge on condenser 51 is dissipated through resistance 49 to bring its charge to a value permitting space current flow in device 47. This current flow causes the anode of that device to become more negative relative to the voltage of source 46, thereby tending to cause the cathodes of devices 9 and 10 to become negative relative to the control electrodes. This voltage is sufficient to render devices 9 and 10 conducting even when maximum current flows through device 34, thus disabling the control exercised by device 34. Consequently the apparent primary impedance of transformer 11 is small and nearly full line voltage is applied to motor 6, Fig. 1.

The above described portion of the circuit of Fig. 2 provides a number of features particularly useful in color television receivers. When the receiver is tuned from one station to another, or the transmitter discontinues operation, the normal operation of the equipment shown in Figs. 1 and 2 is to place a negative bias voltage at devices 9 and 10 if the last pulse of wave 13 happens to be at an instant when the circuit is acting to decelerate motor 6. At a later time, this charge leaks off and the control electrode-cathode bias at device 34 becomes the equilibrium value determined by the construction of that device, a value that may correspond to a relatively low voltage at motor 6. This reduces the speed of motor 6 and renders more difficult restoration of synchronism when a new wave 13 is applied. Furthermore, the speed reduction may be so great that the starting winding of the motor is switched in by the centrifugal switch normally used for this purpose, thereby causing that winding to be energized for a long period of time and overheating or burning it out. Finally, the motor, when operating at subnormal speed, draws large, low power factor, currents which increase the temperature of both motor 6 and transformer 11, thereby contributing to failure of these equipments. With the circuit of Fig. 2, this possibility is prevented for no matter when the last pulse of wave 13 occurs, devices 9 and 10 are rendered conducting, thereby applying full voltage to motor 6 and causing it to operate at a speed slightly in excess of that corresponding to synchronism, a condition that prevents overheating of the equipment and prepares it for rapid synchronization with a new synchronizing wave 13.

While I have shown and described particular embodiments of my invention, it will be obvious to those skilled in the art that changes and modifications may be made without departing therefrom. In particular, the invention may be applied to all types of speed control systems and is not limited to color disk rotating systems for color television receivers. I therefore aim in the appended claims to cover all such changes and modifications as fall within the true spirit and scope of my invention.

What I claim as new and desire to secure by Letters Patent of the United States is:

1. In a television receiver of the type wherein a rotatable color filter is synchronized with scanning operations at a television transmitter to produce successive images having the various color components of the visual program, an alternating current motor connected to rotate said filter and having angular velocity dependent on applied electromotive force, a source of alternating electromotive force connected to said motor, a transformer having a primary winding and a secondary winding, means connecting said primary winding in series with said source and said motor, an impedance in the secondary winding of said transformer, and means to vary the value of said impedance in accordance with the relation of the actual angular position and velocity of said filter and the desired angular position and velocity, thus to synchronize said filter with scanning operations at said transmitter.

2. In a television receiver of the type wherein a rotatable color filter is synchronized with scanning operations at a television transmitter to produce successive images having the various color components of the visual program, an alternating current motor connected to rotate said filter and having operating speed varying in accord with applied voltage, a source of alternating electromotive force for said motor, a transformer having a primary winding and a secondary winding, means connecting said primary winding in series with said source and said motor, an impedance, means connecting said impedance in the secondary winding of said transformer, and means to vary the value of said impedance in accordance with the relation of the actual angular position and velocity of said filter and the desired angular position and velocity, said last means altering the value of said impedance in accordance with both the actual value of said relation and the rate of change of said relation.

3. In a synchronizing system the combination comprising, an electron discharge device having a cathode, a control electrode, and an anode, a capacitor connected between said control electrode and said cathode, a source of electromotive force normally having recurrent pulses of negative synchronizing voltage, a rectifier, means connecting said capacitor, said source, and said rectifier in series relation so that said pulses tend to charge said condenser in direction to place a negative bias voltage at said control electrode, thus to build up charge sufficient to stop space current flow in said device, a source of unidirectional electromotive force and a resistance in series connection across said condenser, said source and said resistance having values such as to cause predetermined space current flow in said device when said first source does not have said pulses.

4. In a synchronizing system comprising, a utilization device, means to operate said device in desired relationship to a predetermined quantity, said means including a first resistor, a source of error voltage proportional to the departure of the operation of said device from said desired relationship, a second resistance connected in series between said error voltage source and said first resistance to supply said error voltage to said utilization device, a first capacitor connected in series between said source and a variable point on said first resistance to provide a desired derivative component of error voltage at said variable point, and a second capacitor connected between said variable point and the junction of said first and second resistances thereby to supply said error voltage derivative to said utilization device.

ROBERT B. DOME.

REFERENCES CITED

The following references are of record in the file of this patent:

UNITED STATES PATENTS

| Number | Name | Date |
|---|---|---|
| 2,246,284 | Artzt | June 17, 1941 |
| 2,263,641 | Nicolson | Nov. 25, 1941 |
| 2,319,789 | Chambers | May 25, 1943 |
| 2,329,194 | Goldmark | Sept. 14, 1943 |
| 2,350,008 | Artzt | May 30, 1944 |
| 2,351,759 | Grundmann | June 20, 1944 |
| 2,352,541 | Harper | June 27, 1944 |
| 2,378,746 | Beers | June 19, 1945 |
| 2,399,421 | Artzt | Apr. 30, 1946 |